(12) United States Patent  (10) Patent No.: US 6,237,980 B1
Miles et al.  (45) Date of Patent: *May 29, 2001

(54) VEHICLE BED LINERS

(75) Inventors: Keith H. Miles, Cassopolis, MI (US); Timothy J. Fleming, Greenville, OH (US)

(73) Assignee: LRV Acquisition Corporation, Wapakaneta, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,713

(22) Filed: Oct. 15, 1997

(51) Int. Cl.[7] ................................... B60R 13/01
(52) U.S. Cl. ............................................ 296/39.2
(58) Field of Search ................. 296/39.2, 39.1; 224/405, 400

(56) References Cited

U.S. PATENT DOCUMENTS

| | | |
|---|---|---|
| 3,578,375 | 5/1971 | Finefrock . |
| 3,652,123 | 3/1972 | Speers . |
| 4,363,617 | 12/1982 | Hirsekorn . |
| 4,428,306 | 1/1984 | Dresen et al. . |
| 4,432,580 | 2/1984 | Lohmar et al. . |
| 4,592,583 * | 6/1986 | Dresen et al. ............ 296/39.2 |
| 4,693,507 | 9/1987 | Dresen et al. . |
| 4,917,431 * | 4/1990 | McDonald ............ 296/39.1 |
| 4,944,612 * | 7/1990 | Abstetar et al. .......... 296/39.2 |
| 4,986,590 | 1/1991 | Patti et al. . |
| 5,370,436 | 12/1994 | Martindale et al. . |
| 5,470,642 * | 11/1995 | Egigian .............. 296/39.1 X |
| 5,505,512 | 4/1996 | Martindale et al. . |
| 5,551,742 | 9/1996 | Martindale et al. . |
| 5,597,194 * | 1/1997 | Daugherty et al. ........ 296/39.2 |
| 5,636,883 | 6/1997 | Johns . |
| 5,648,031 | 7/1997 | Sturtevant et al. . |
| 5,695,235 * | 12/1997 | Martindale et al. ........ 296/39.2 |
| 5,858,508 | 1/1999 | Sturtevant et al. . |
| 5,992,915 | 11/1999 | Thompson et al. . |

* cited by examiner

*Primary Examiner*—D. Glenn Dayoan
*Assistant Examiner*—Jason Morrow
(74) *Attorney, Agent, or Firm*—Dinsmore & Shohl LLP

(57) ABSTRACT

A bed liner for use with a vehicle cargo bed is provided, wherein the cargo bed has a bottom wall, a front wall and side walls. The cargo bed liner is a relatively rigid body with an inner surface and an outer surface and one or more areas which engage the cargo bed in use. The body comprises a bottom wall member for engaging the bottom wall of the vehicle cargo bed along at least a portion of the outer surface, two side wall members connected to the bottom wall member and extending upwardly therefrom, and a front wall member connected to the bottom wall member also extending upwardly therefrom. The side and front wall members are adapted to closely follow the walls of the vehicle cargo bed. A wear inhibiting surface is provided which covers at least selected portions of the outer surface. The wear inhibiting surface has a relatively high coefficient of friction and is relatively soft in comparison to the relatively rigid body.

21 Claims, 6 Drawing Sheets

VEHICLE BED LINERS

TECHNICAL FIELD OF THE INVENTION

This invention relates generally to the field of liners for a cargo bed of a vehicle, and, more particularly, to the field of liners having wear inhibiting portions or surface coating applied thereto for use with a truck cargo bed.

BACKGROUND OF THE INVENTION

Liners for vehicle cargo beds are known in the art. For example, U.S. Pat. No. 4,693,507 to Dresen et al. suggests a cargo bed liner for a pickup truck which is vacuum formed of unitary plastic. An elastomer material having an effectively high coefficient of friction is co-formed with and integrally adhered to the plastic forming the liner to purportedly provide an anti-slip surface for restraining movement of cargo on the top surface of the liner.

Another bed liner is discussed in U.S. Pat. No. 5,636,883 in the form of a liner for a front and side walls of a pickup truck bed, wherein a portion of the liner is purportedly reversible to allow a choice between which surface will contact the pickup truck bed. The liner comprises an outer panel removably attached to an inner panel along a common edge using hook and loop material. The inner panel is made of two pieces of material, one being soft, such as felt or artificial fleece, and the other being tougher and more durable. Having two different surfaces purportedly allows the user of the device to select which surface will contact the inner wall of the truck bed and which surface will contact a load located in the cargo bed, with the softer first side normally expected to contact the inner wall of the truck bed to prevent damage to the truck's paint.

While these and other prior cargo bed liners may have been suitable for their intended purpose, it has been found that some prior cargo bed liners can prematurely wear or otherwise remove paint from a truck cargo bed during use. Accordingly, there exists a continuing need to provide cargo bed liners having wear inhibiting characteristics, such as a surface applied thereto, which can prevent damage to the cargo bed's paint during use. More particularly, there is a continuing need to provide cargo bed liners having a wear inhibiting surface or portions of a surface applied thereto which can prevent abrasive wear of the cargo bed's paint during use. In addition, there is a continuing need to provide such wear inhibiting characteristics in a form which can be easily manufactured with the cargo bed liner. The present invention provides structures which can accommodate these benefits.

SUMMARY OF THE INVENTION

Accordingly, it is an object of the present invention to obviate the above-described problems and shortcomings of vehicle bed liners.

It is another object of the present invention to provide improved vehicle bed liners featuring a structure adapted to prevent wear of the paint of a vehicle cargo bed.

It is still another object of the present invention to provide improved vehicle bed liners having a wear inhibiting surface or coating which can be incorporated in varying types of vehicle bed liners.

In accordance with one aspect of the present invention, a bed liner for use with a vehicle cargo bed is provided, wherein the vehicle cargo bed has a bottom wall, a front wall and side walls. The cargo bed liner has a relatively rigid body with an inner surface and an outer surface and one or more areas which engage the cargo bed in use. The body comprises a bottom wall member for engaging the bottom wall of the vehicle cargo bed along at least a portion of the outer surface, two side wall members connected to the bottom wall member and extending upwardly therefrom, and a front wall member connected to the bottom wall member also extending upwardly therefrom. The side and front wall members are adapted to closely follow the walls of the vehicle cargo bed. A wear inhibiting surface is provided which covers at least selected portions of the outer surface. The wear inhibiting surface has a relatively high coefficient of friction and is relatively soft in comparison to the relatively rigid body.

In a preferred embodiment, the wall members of the cargo bed liner are integrally connected and have a thickness of between about 0.04 inches and about 0.18 inches, and the wear inhibiting surface is formed from a blend of low density polyethylene and a polyolefin elastomer. The wear inhibiting surface preferably has a thickness of between about 0.01 inches and about 0.05 inches, and covers substantially all of the outer surface of one or more wall members or only selected portions thereof.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

DETAILED DESCRIPTION OF THE PREFERRED EMBODIMENTS

Figure 1:
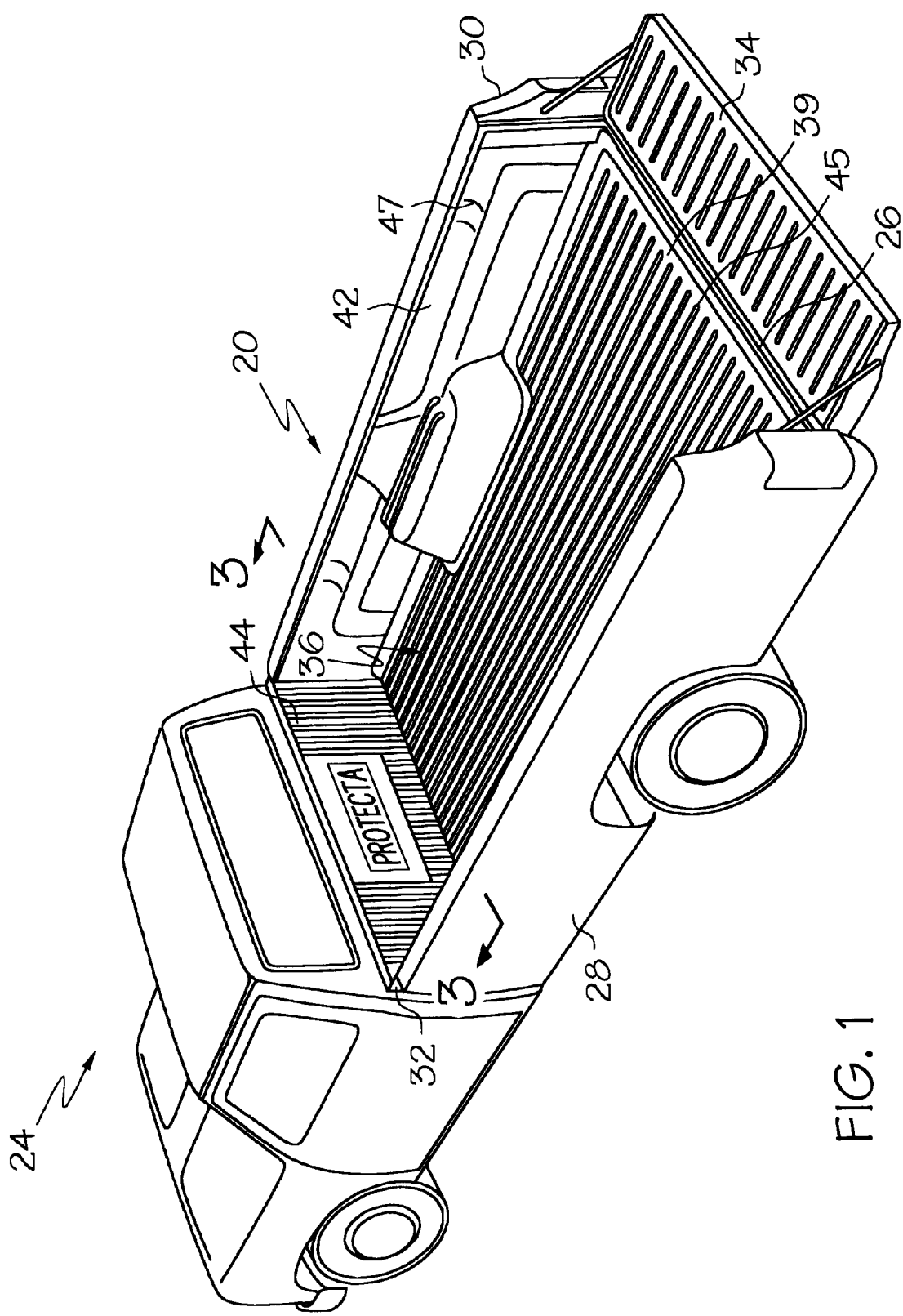
FIG. 1 is a perspective view of a vehicle incorporating a cargo bed liner made in accordance with the present invention.
Figure 3:
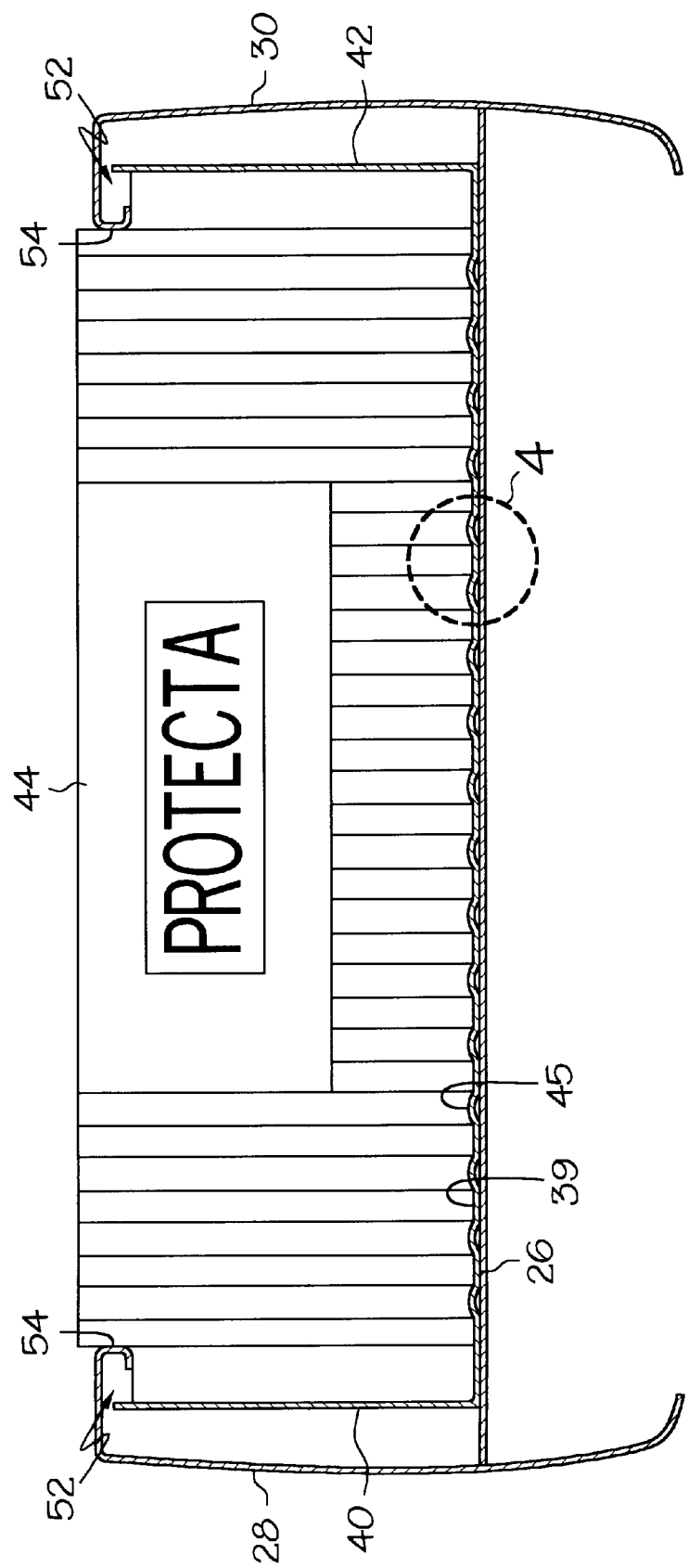
FIG. 3 is a partial cross-sectional end view of the cargo bed liner of FIG. 1, taken along line 3—3 thereof.

Reference will now be made in detail to the present preferred embodiments of the invention, examples of which are illustrated in the accompanying drawings, wherein like numerals indicate the same elements throughout the views. A particularly preferred embodiment of the present invention is illustrated in FIG. 1 as an exemplary cargo bed liner 20 which is installed in a cargo bed of a vehicle 24. The cargo bed of vehicle 24 has a bottom wall 26, two upstanding side walls 28 and 30 which are connected to the bottom wall 26, and an upstanding front wall 32 also connected to the bottom wall 26. The bottom wall 26 can be provided in a substantially planar form (as seen in FIG. 3), or with ridges which facilitate the drainage of water and other liquids from the cargo bed. The walls 26, 28, 30, and 32 along with a tail gate 34 define a cargo compartment 36 for the storage of cargo.

Figure 2:
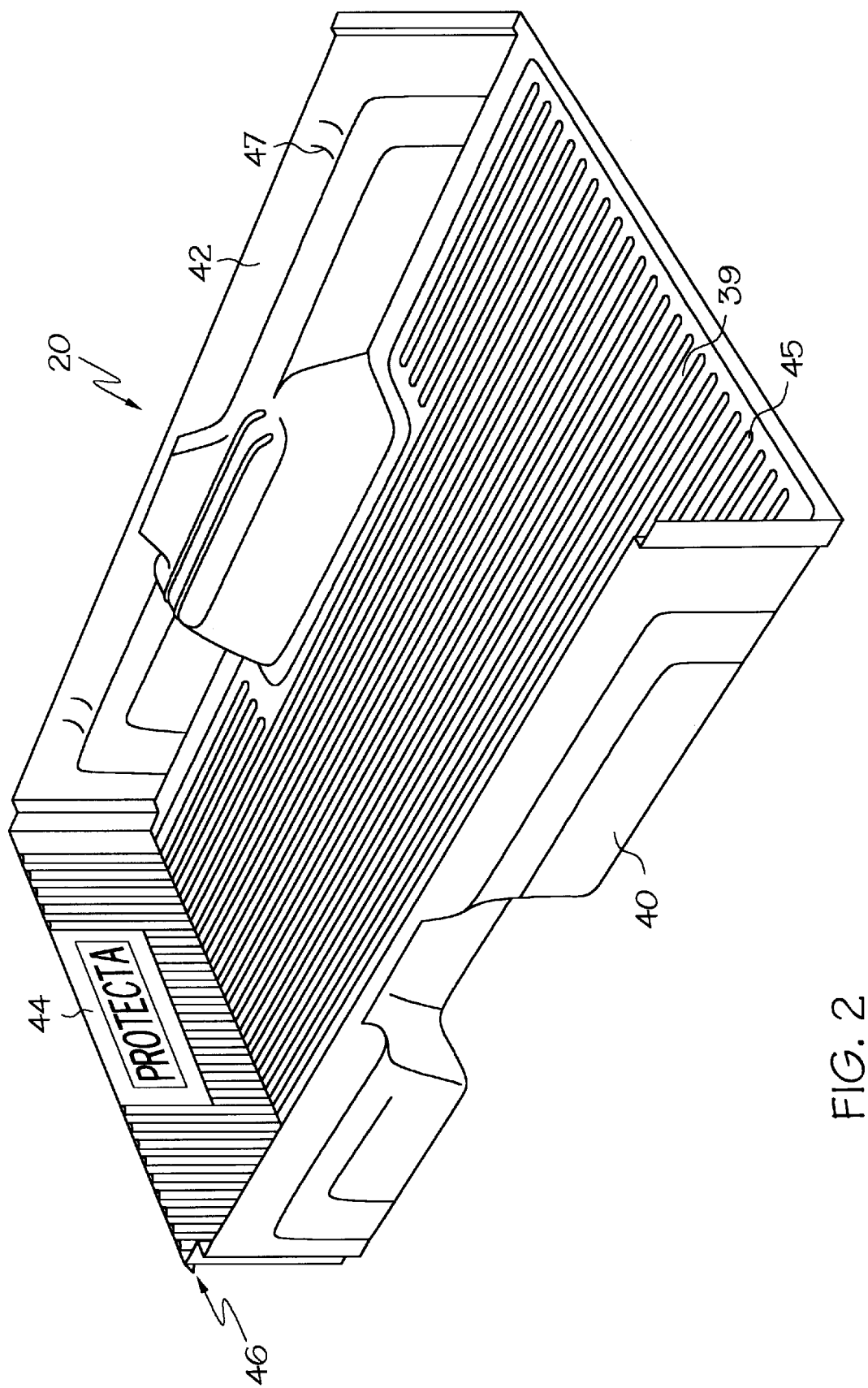
FIG. 2 is a perspective view of the cargo bed liner of FIG. 1.

While some details of the construction of the cargo bed liner 20 are discussed in U.S. Pat. No. 4,752,097, which is hereby fully incorporated herein by reference, the conventional structure of the cargo bed liner 20 will now be discussed for reasons of clarity. As seen most clearly in FIGS. 2, 3 and 4, cargo bed liner 20 is illustrated as having an inner surface 37 (FIG. 4) for receiving cargo when the cargo bed liner 20 is installed in the cargo bed of the vehicle 24 and an outer surface 38 (FIG. 4) which is disposed adjacent one or more of the walls (e.g., 26,28,30,32) of the cargo bed during use. As best seen in FIG. 2, the cargo bed liner 20 further comprises a bottom wall member 39, two generally upstanding side wall members 40 and 42 which are connected to the bottom wall member 39, and a generally upstanding front wall member 44 also connected to the bottom wall member 39 and each of the side wall members 40 and 42.

The front and side wall members can be integrally formed with the bottom wall member 39 and each other or can be attached by the use of fasteners, if desired. The front wall member 44 preferably terminates with a generally inverted V-shaped channel portion 46 or "rolled lip" which can add strength to the front wall member. This structure can also thereby prevent dirt and other debris from collecting between the cargo bed liner 20 and the cargo bed during use. In addition, one or more wall members of the cargo bed liner 20 can be provided with ridges of varying shapes and sizes (e.g., 45), cut-outs (e.g., 47), tie downs or other structures for aiding in the storage of cargo within the cargo bed liner 20 as desired without departing from the scope of the present invention.

The wall members of the cargo bed liner 20 are preferably formed from a plastic resin which provides a lightweight yet substantially rigid liner 20 while accommodating a wear inhibiting surface 48 which can be preferably integrally formed and/or coextruded with at least a portion of the outer surface 38 of a wall member of the cargo bed liner 20, as described more fully hereafter. More preferably, the wall members of the cargo bed liner 20 are formed of materials such as high density polyethylene (HDPE), acrylonitrile butadiene styrene (ABS), or similar plastic. Most preferably, the wall members are made from a high molecular weight high density polyethylene (HMWHDP or HDPE) having a melt index of between about 10 and about 12 grams per 10 minutes (at a condition of 190° C. and weight of 21.60 grams) and have a formed thickness T (FIG. 4) of between about 0.04 inches and about 0.18 inches.

Figure 4:
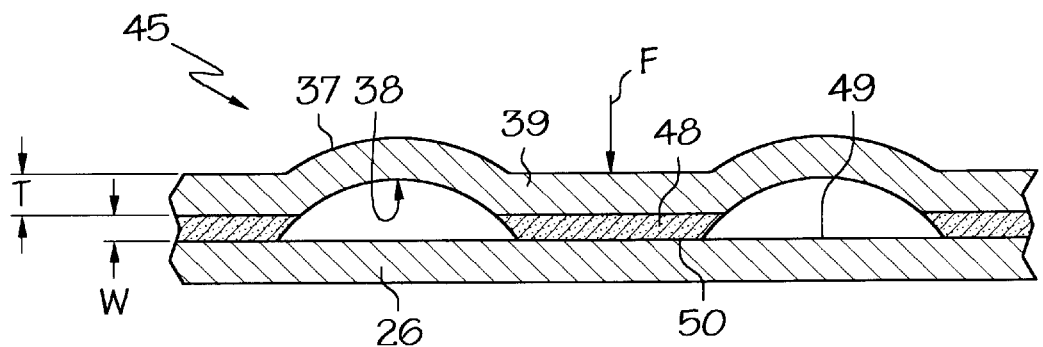
FIG. 4 is an enlarged partial cross-sectional end view of the cargo bed liner of FIG. 3, as indicated at circle 4 thereof.
Figure 7:
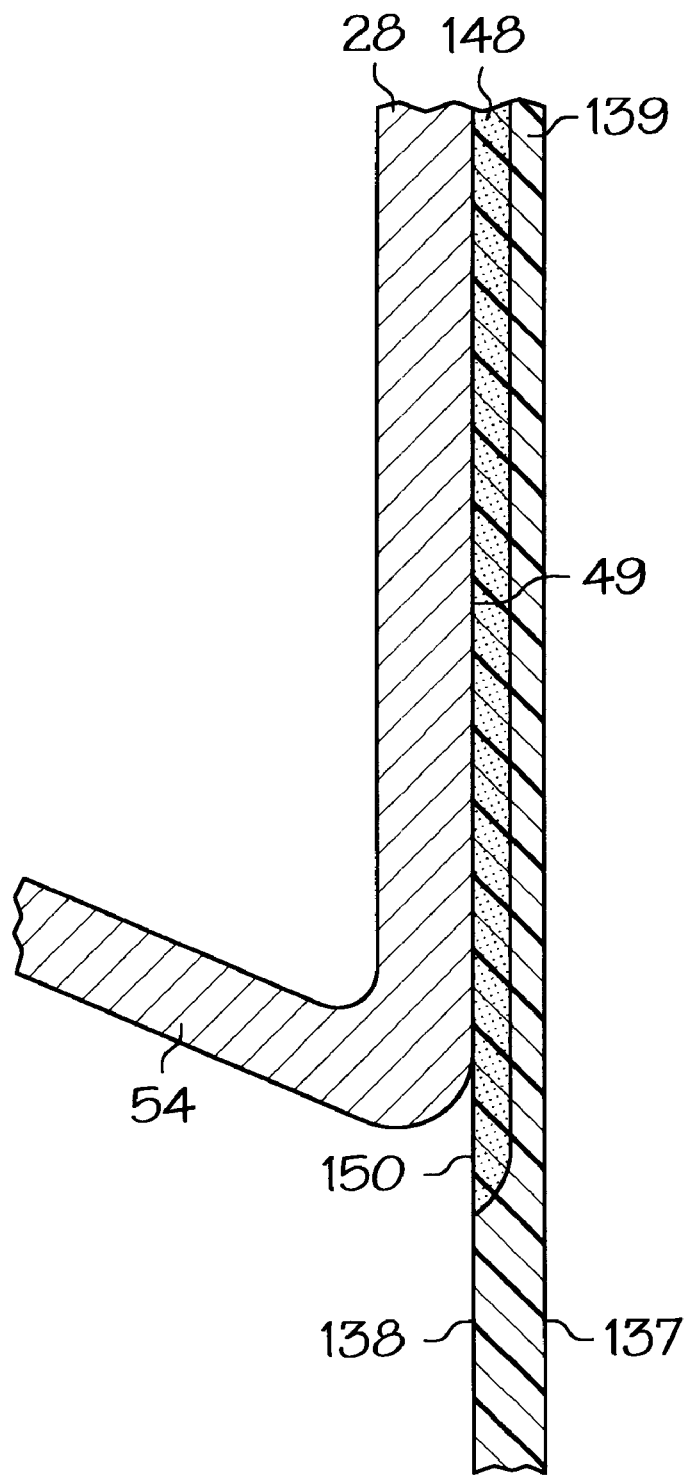
FIG. 7 is an enlarged partial cross-sectional end view of the cargo bed liner of FIG. 6, as indicated at circle 7 thereof.

In accordance with one aspect of the present invention and as most clearly seen in FIG. 4, a portion of the outer surface 38 is provided with the wear inhibiting surface 48 having an outer surface 50. The wear inhibiting surface 48 preferably covers at least portions of the outer surface 38 of the wall members of the cargo bed liner 20 which would otherwise contact a paint layer 49 of the cargo bed of the vehicle 24 during use, thereby preventing damage, such as abrasive wear, of the paint layer 49. The outer surface 50 of the wear inhibiting surface 48 can be provided beyond the portions of the outer surface 38 which are not covered by the wear inhibiting surface 48, as generally shown in FIG. 4, or can be provided substantially co-extensive with the portions of the outer surface 38 which are not covered by the wear inhibiting surface 48, as shown in FIG. 7 with respect to the wear inhibiting surface 148. As should be understood, the size and location(s) of the one or more wear inhibiting surfaces of the present invention (e.g., 48 and 148), can be determined and modified as desired to best respond to the interacting structure of the cargo bed liner with the particular truck cargo bed. While it may be most efficient and facilitate the manufacturing process to provide a wear inhibiting surface as a single area which covers a predetermined portion of the outer surface of a cargo bed liner made in accordance with the present invention, it is contemplated that there may also be applications where a plurality of more localized and separate portions or areas of the outer surface will be treated with the wear inhibiting surface.

The wear inhibiting surface 48 preferably has a formed thickness W therethrough of less than about 0.05 inches, more preferably between about 0.01 and 0.05 inches, and, most preferably, about 0.02 inches. In addition, the wear inhibiting surface 48 will preferably feature a relatively high coefficient of friction which tends to prevent relative motion between the cargo bed and the cargo bed liner 20 during use. More preferably, the static coefficient of friction is between about 0.25 and about 0.6 when measured according to a modified ASTM procedure D1894-90, wherein a test specimen loaded with a 5-pound weight is pulled at 5 inches per minute across a cold rolled high carbon steel substrate polished smooth to the touch. Most preferably, the static coefficient of friction is about 0.55. The effect of this relatively high coefficient of friction can be further enhanced by providing a wear inhibiting surface 48 which has a slight tack and/or texturing associated therewith, and it is contemplated that higher coefficients of friction can thus be provided. The wear inhibiting surface 48 is also relatively soft in comparison to the portion of the paint layer 49 disposed adjacent the wear inhibiting surface 48 and the material forming the more rigid wall members of the cargo bed liner 20.

The wear inhibiting surface 48 can be formed from a rubber-like material, and, more preferably, from a blend of a linear low density polyethylene and a polyolefin elastomer. Most preferably, the wear inhibiting surface 48 is formed from a blend of about equal parts (i.e., about a 50/50 blend) of ENGAGE® 8150, which is manufactured by DuPont Dow Elastomers of Southfield Mich., and MARLEX K203, which is manufactured by Phillips Chemical Company of Houston Tex. Preferably, this blend has a melt index of less than about 20 grams per 10 minutes (at a condition of 190° C. and weight of 21.60 grams), and, more preferably, a melt index about the same as the material forming the wall members of the cargo bed liner (e.g., HDPE). While about a 50/50 blend is preferred, blends between about 40/60 and about 60/40 can also be suitable and will provide a wear inhibiting surface 48 having the desired wear inhibiting characteristics (e.g., relatively soft, relatively high coefficient of friction) while still capable of being co-formed and/or co-extruded with the material forming the substantially rigid wall members without undesirable processing limitations, such as chatter or a blend which is too tacky such that processing is difficult and expensive. In addition, it is contemplated that additives, including colorants, can be added to the above-described blend without departing from the scope of the present invention.

It is contemplated that a preferred cargo bed liner of the present invention can be manufactured from a sheet of coextruded material, wherein this coextruded sheet comprises a first material forming the wall members of the cargo bed liner 20 and a second material forming the wear inhibiting surface 48. The sheet material following coextrusion (but before thermoforming) preferably has a thickness of between about 0.21 inches and about 0.27 inches. While coextrusion of the two materials is preferred, it is contemplated that the cargo bed liner can be manufactured from a sheet of material which forms the wall members of the cargo bed liner, wherein the material forming the wear inhibiting surface 48 is applied, such as by spraying, after extrusion of the sheet.

The shape and structures of the cargo bed liner 20 (e.g., wall members 39, 40, 42, 44, etc.) can thereafter be formed by thermoform molding of the coextruded sheet, such as by heating the sheet to its softening point and pressing the sheet against the contours of a mold in the shape of the cargo bed liner 20. Vacuum, air, or mechanical means can be used to press the heated sheet against the mold so that the coextruded sheet takes the form of the mold. This process of thermoforming is widely utilized in the manufacture of liners of the type contemplated herein, and additional details of such process are not believed to be necessary for an understanding of the present invention. It should also be understood, that other methods of providing the wear inhibiting surface can be employed as appropriate. For example, the wear inhibiting surface could be applied after molding, such as by coating, spraying, dipping or laminating. Many such processes are known, and others will become apparent to those skilled in the art, without departing from the scope of this invention. Any of these methods for ensuring that the material to provide the wear inhibiting surface is provided on the selected portions of the outer surface of the resulting liner can be implemented accordingly.

While not intending to be bound by any theory, it is believed that a wear inhibiting surface having a relatively high coefficient of static friction and a relatively low coefficient of dynamic friction can prevent abrasive wear of the paint layer 49 because the relatively high coefficient of static friction prevents relative motion which shears paint particles from the paint layer 49. The relative softness of the wear inhibiting surface 48 also reduces wear of the paint layer 49 because the relatively softer wear inhibiting surface is also less likely to shear or remove paint particles from the relatively harder paint layer 49 if any relative motion does occur. In addition, a relatively softer wear inhibiting surface 48 can deform around abrasive particles located between the wear inhibiting surface 48 and the paint layer 49, thereby distributing the load F around an abrasive particle so as to minimize any abrasive effect caused by relative motion between the cargo bed and the bed liner 20.

While the wear inhibiting surface 48 has been described herein as covering only portions of the outer surface 38 of the cargo bed liner 20, it is contemplated that the wear inhibiting surface 48 can alternatively cover substantially all of the outer surface 38 and/or (as mentioned above) can cover portions of the inner surface 37 which might contact the paint layer 49 of the cargo bed during use. In addition, it is contemplated that the outer surface can be provided with outwardly extending protrusions having the wear inhibiting surface 48 disposed thereon if desired.

The under-the-rail style cargo bed liner 20 of FIGS. 1–3 is installed in the cargo bed of the vehicle 24 by positioning the liner 20 in the cargo bed with the side wall members 40 and 42 positioned adjacent the side walls 28 and 30 of the vehicle 24 and the front wall member 44 positioned adjacent the front wall 32. The side wall members 40 and 42 are then flexed downwardly and toward the side walls 28 and 30 with the side wall members 40 and 42 fitting below cargo bed channels 52 of the vehicle 24, as shown in FIG. 3. The side wall members 40 and 42 are then released to snap fit under the cargo bed channels 52 behind flanges 54 thereof. With the side wall members 40 and 42 so secured, channel portion 46 of the front wall member 44 preferably abuts the front wall 32.

Figure 5:
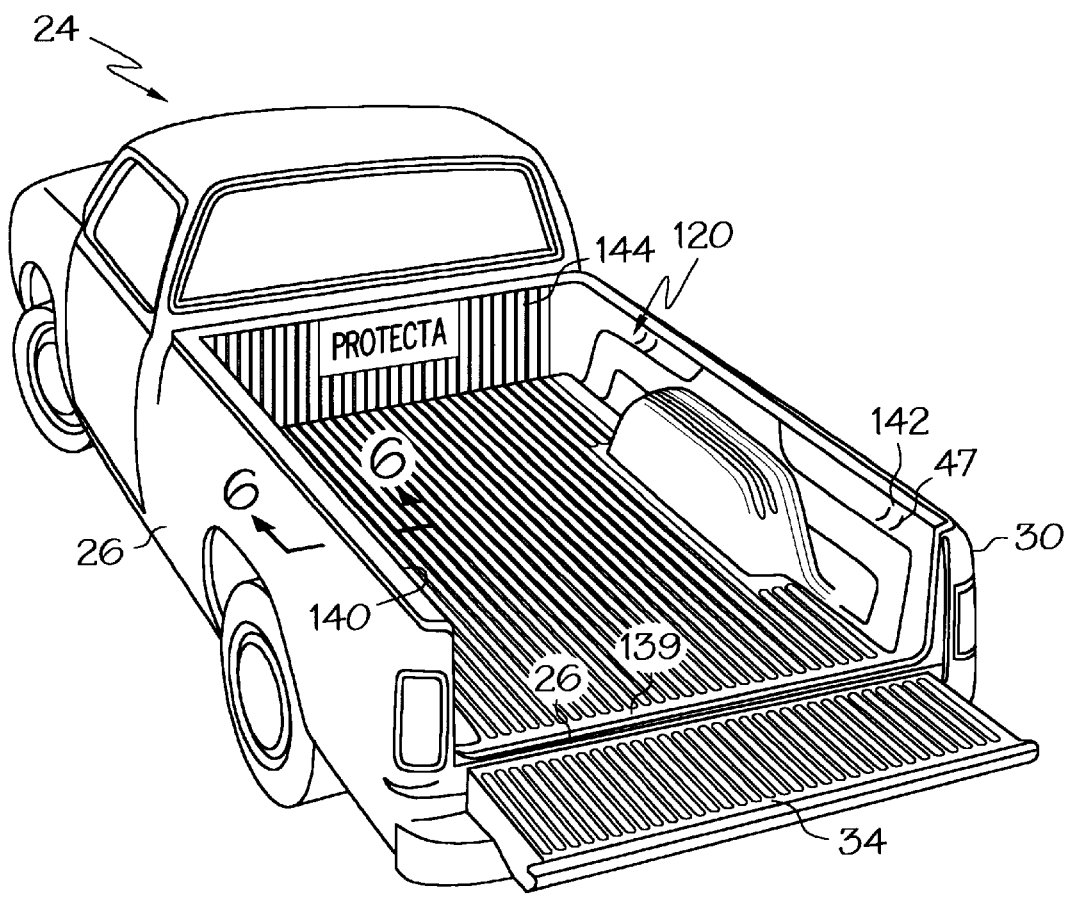
FIG. 5 is a perspective view of a vehicle incorporating an exemplary over-the-rail cargo bed liner made in accordance with the present invention.

While the present invention has been described herein with respect to a preferred cargo bed liner 20 which is secured under the cargo bed channels 52 of the side walls 28 and 30 during use, it is contemplated that the present invention can be adapted to other bed liner structures. For example, another common bed liner is an over-the-rail style such as illustrated in FIG. 5 as element 120, suitable for use with the vehicle 24 and made in accordance with the present invention. The conventional structure of the cargo bed liner 120 is described more fully in U.S. Pat. No. 4,595,229, which is hereby fully incorporated herein by reference, although certain details are described hereafter for clarity. The cargo bed liner 120 comprises a bottom wall member 139, two generally upstanding side wall members 140 and 142 which are connected to the bottom wall member 139, and a generally upstanding front wall member 144 which is also connected to the bottom wall member 139.

Figure 6:
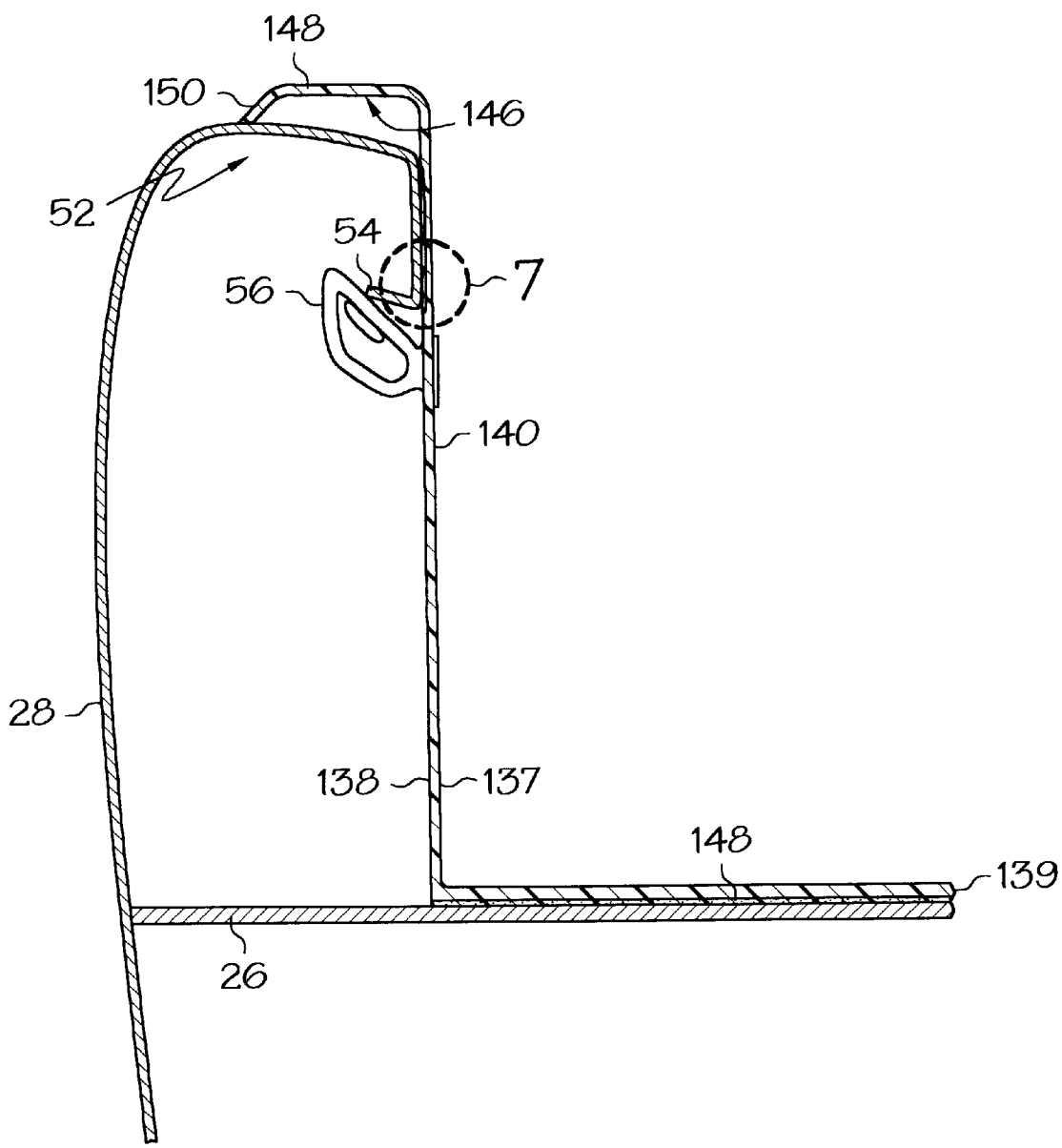
FIG. 6 is an enlarged partial cross-sectional end view of the cargo bed liner of FIG. 5, taken along line 6—6 thereof.

While the wall members of the cargo bed liner 120 also comprise a generally inverted U-shaped channel portion 146, as shown in FIG. 6, the outer surface 138 of these channel portions are adapted to engage the side walls 28 and 30 as well as the front wall 32 of the vehicle 24 rather than fit under the cargo bed channels 52 as with the cargo bed liner 20. The cargo bed liner 120 can be retained in place by a plurality of clips 56 which extend through the side wall members of the cargo bed liner 120 and engage the underside of the cargo bed channel 52 adjacent a downwardly depending extension 54, or more preferably by snap-type clips as described in U.S. Pat. No. 5,046,775 (the disclosure of the '755 patent being hereby incorporated herein by reference)

The same as previously described with respect to the cargo bed liner 20, portions of the outer surface 138 (including, for example, the outer surface 138 of the U-shaped channel portions 146 of the wall members of the cargo bed liner 120) can be covered by a wear inhibiting surface 148 to prevent damage and abrasive wear of the paint layer 49 at locations where the wall members of the cargo bed liner 120 engage the cargo bed of the vehicle 24, as shown for example in FIG. 7. The wear inhibiting coating 148 preferably has same physical properties and is formed from the same materials as the wear inhibiting surface 48 of the cargo bed liner 20. The wear inhibiting surface 148 can also cover portions of the side wall members (e.g., 140) which are disposed adjacent to the side walls of the vehicle 24 (e.g., 28), or can also cover portions of the outer surface 138 of the bottom wall member 139, as seen in FIGS. 6 and 7.

Having shown and described the preferred embodiments of the present invention, further adaptions of the bed liners described herein can be accomplished by appropriate modification by one of ordinary skill in the art without departing from the scope of the present invention. Several of such potential modifications have been mentioned, and others will be apparent to those skilled in the art. For example, the wear inhibiting surface can be adapted for use with cargo bed liners having other shapes and constructions. In addition, it is contemplated that the cargo bed liners of the present invention can be provided with additional coatings or surfaces, such as an anti-slip coating on at least a portion of the inner surface of the cargo bed liner. The particular embodiments shown and described herein are intended only as preferred exemplary arrangements of the various structures and functions of the present invention. Accordingly, the scope of the present invention should be considered in terms of the following claims and is understood not to be limited to the details of the structures and operations shown and described in the specification and drawings.

What is claimed is:

1. A bed liner for use with a vehicle cargo bed having a bottom wall, a front wall and side walls, comprising:
   a substantially rigid body having an inner surface for receiving cargo during use and an outer surface and one or more areas which engage the cargo bed in use, said body further comprising:
   (a) a bottom wall member for engaging the bottom wall of the vehicle cargo bed along at least a portion of said outer surface;
   (b) two side wall members connected to said bottom wall member and extending upwardly therefrom, said side wall members being adapted to correspond with and closely follow the walls of the vehicle cargo bed in use;
   (c) a front wall member connected to said bottom wall member and extending upwardly therefrom and being adapted to closely follow the front wall of the vehicle cargo bed; and
   (d) a wear inhibiting surface covering at least selected portions of said outer surface, said wear inhibiting surface having a coefficient of static friction of at least about 0.25.

2. The bed liner of claim 1, wherein said wall members are integrally connected.

3. The bed liner of claim 1, wherein said wear inhibiting surface is formed from a blend of linear low density polyethylene and a polyolefin elastomer.

4. The bed liner of claim 1, wherein said wall members of said body have a thickness of between about 0.04 inches and about 0.18 inches.

5. The bed liner of claim 1, wherein said wear inhibiting surface has a thickness of between about 0.01 inches and about 0.05 inches.

6. The bed liner of claim 1, wherein said wear inhibiting surface covers substantially all of said outer surface of said bottom wall member.

7. The bed liner of claim 6, wherein said wear inhibiting surface covers a substantial portion of said outer surface of said side wall members.

8. The bed liner of claim 7, wherein said wear inhibiting surface covers a substantial portion of said outer surface of said front wall member.

9. A bed liner for use with a vehicle cargo bed having a bottom wall, a front wall and side walls, comprising:
   a substantially rigid body having an inner surface for receiving cargo during use and an outer surface and one or more areas which engage the cargo bed in use, said body further comprising:
   (a) a bottom wall member for engaging the bottom wall of the vehicle cargo bed along at least a portion of said outer surface;
   (b) two side wall members integrally connected to said bottom wall member and extending upwardly therefrom, said side wall members being adapted to correspond with and closely follow the walls of the vehicle cargo bed in use;
   (c) a front wall member integrally connected to said bottom wall member and said side wall members, said front wall member extending upwardly from bottom wall member and being adapted to closely follow the front wall of the vehicle cargo bed; and
   (d) a wear inhibiting surface covering at least selected portions of said outer surface, said wear inhibiting surface having a coefficient of static friction of at least about 0.25 and being relatively soft in comparison to said body and said wear inhibiting surface being formed from a blend of low density polyethylene and a polyolefin elastomer.

10. The bed liner of claim 9, wherein said wear inhibiting surface has a thickness of between about 0.01 inches and about 0.05 inches.

11. The bed liner of claim 9, wherein said wear inhibiting surface covers substantially all of said outer surface of said bottom wall member.

12. The bed liner of claim 11, wherein said surface wear inhibiting covers substantially all of said outer surface of said side wall members.

13. The bed liner of claim 12, wherein said wear inhibiting surface covers substantially all of said outer surface of said front wall member.

14. The bed liner of claim 9, wherein said wear inhibiting surface has a coefficient of static friction of between about 0.25 and about 0.6.

15. A method of forming a cargo bed liner for use with a vehicle cargo bed having a bottom wall, a front wall, and side walls, comprising the steps of:
   providing a sheet comprising a first material and a second material;
   forming a substantially rigid cargo bed liner from said sheet, said cargo bed liner having an inner surface for receiving cargo during use and an outer surface and one or more areas which engage the cargo bed during use, said first material forming a bottom wall member and two side wall members connected to said bottom wall member and extending upwardly therefrom and a front wall member connected to said bottom wall member and extending upwardly therefrom; and
   ensuring that said second material forms a wear inhibiting surface covering at least selected portions of said outer surface, said wear inhibiting surface having a coefficient of static friction of at least about 0.25 and being relatively soft in comparison to said first material.

16. The method of claim 15, further comprising the step of coextruding said sheet.

17. The method of claim 15, wherein said step of forming comprises the step of thermoforming said cargo bed liner from said sheet.

18. The method of claim 15, wherein said second material is provided as a blend comprising linear low density polyethylene and a polyolefin elastomer.

19. The method of claim 15, wherein said step of ensuring comprises arranging said second material so that it will be adjacent said selected portions of said outer surface following the forming step.

20. The bed liner of claim 1, wherein said wear inhibiting surface is relatively soft in comparison to said body.

21. The bed liner of claim 1, wherein said wear inhibiting surface has a coefficient of static friction of between about 0.25 and about 0.6.

* * * * *